US008848310B2

(12) United States Patent
Buch (10) Patent No.: US 8,848,310 B2
(45) Date of Patent: Sep. 30, 2014

(54) OFFSET CORRECTION VALUES ON A DATA STORAGE MEDIA

(71) Applicant: Seagate Technology LLC, Cupertino, CA (US)

(72) Inventor: Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/734,036

(22) Filed: Jan. 4, 2013

(65) Prior Publication Data

US 2014/0192435 A1 Jul. 10, 2014

(51) Int. Cl.
  *G11B 21/02* (2006.01)
  *G11B 15/18* (2006.01)
  *G11B 5/55* (2006.01)

(52) U.S. Cl.
  CPC ..................................... *G11B 5/553* (2013.01)
  USPC ............................................. 360/75; 360/71

(58) Field of Classification Search
  None
  See application file for complete search history.

(56) References Cited

U.S. PATENT DOCUMENTS

| 5,956,200 A * | 9/1999 | Kohno et al. ............... 360/77.04 |
| 6,643,082 B1 | 11/2003 | Belser |
| 6,768,606 B2 * | 7/2004 | Helms ......................... 360/77.01 |
| 7,271,977 B1 * | 9/2007 | Melrose et al. ............. 360/77.04 |
| 7,460,326 B1 * | 12/2008 | Sutardja ........................... 360/75 |
| 7,508,611 B2 | 3/2009 | Buch et al. |
| 7,525,754 B2 * | 4/2009 | Melrose et al. ............. 360/77.04 |
| 7,561,370 B2 * | 7/2009 | Melrose et al. ............. 360/77.04 |
| 7,602,576 B2 * | 10/2009 | Yoshida ...................... 360/77.01 |
| 7,911,724 B2 | 3/2011 | Buch et al. |
| 7,969,676 B2 | 6/2011 | Buch et al. |
| 2009/0147397 A1 | 6/2009 | Kim et al. |
| 2011/0085262 A1 | 4/2011 | Grundvig et al. |
| 2011/0090590 A1 | 4/2011 | Yamamoto et al. |
| 2011/0188149 A1 | 8/2011 | Albrecht et al. |
| 2011/0279924 A1 | 11/2011 | Albrecht et al. |

* cited by examiner

*Primary Examiner* — K. Wong
(74) *Attorney, Agent, or Firm* — Hollingsworth Davis, LLC (57) ABSTRACT

A memory system includes a storage medium having tracks arranged on the storage medium. The tracks include data track portions configured to store data. The tracks have a data track width and offset correction portions having a width that is greater than the data track width of the associated data track. Each offset correction portion stores one or both of positional offset correction values and timing offset correction values. The positional offset correction values are configured to correct for errors that occur in cross track positioning relative to the medium and the timing offset correction values are configured to correct for errors that occur in down track timing relative to the medium.

20 Claims, 7 Drawing Sheets

OFFSET CORRECTION VALUES ON A DATA STORAGE MEDIA

SUMMARY

An apparatus includes a storage medium having tracks arranged on the storage medium. The tracks include data track portions configured to store data. The tracks have a data track width and offset correction portions having a width that is greater than the data track width of an associated data track. Each offset correction portion stores one or both of positional offset correction values and timing offset correction values. The positional offset correction values are configured to correct for errors that occur in cross track positioning relative to the medium and the timing offset correction values are configured to correct for errors that occur in down track timing relative to the medium.

Some embodiments are directed to a method of operating a memory controller. The method includes reading offset correction values from offset correction portions of tracks arranged on a storage medium. The tracks including data track portions configured to store data and having a data track width. Each offset correction portion has a width greater than the data track width of an associated data track and contains one or both of positional offset correction values and timing offset correction values. The method further includes correcting for one or both of errors that occur in cross track positioning relative to the medium using the positional offset correction values and errors that occur in down track timing relative to the medium using the timing offset correction values.

These and other features and aspects of the various embodiments disclosed herein can be understood in view of the following detailed discussion and the accompanying drawings.

DETAILED DESCRIPTION

In some memory devices such as continuous and/or bit patterned media (BPM), for example, specially recorded fields are used to determine the position of read and/or write transducers relative to memory units such as tracks on the media. BPM comprises a pattern of storage islands, each storage island at least partially surrounded by a non-storage region. According to carious implementations, an island may be in the form of round dots. Each storage island may be configured to store one or more bits. According to various embodiments, each storage island is a magnetic island at least partially surrounded by non-magnetic material. In contrast, continuous media facilitates storage anywhere on the media. Some types of memory devices such as BPM drives may also have specially recorded fields to determine the phase of a clock system relative to the arrival of dots on the media under the read and/or write transducers. These fields may be recorded imperfectly in some cases.

Figure 1A:
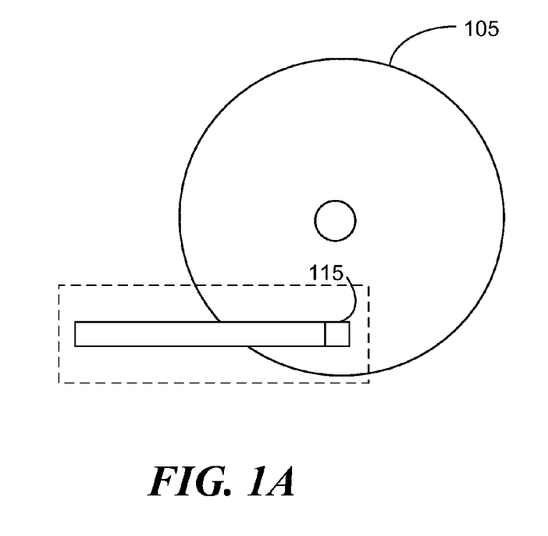
FIG. 1A shows a disk according to various embodiments described herein.

For example, patterned fields may not have spatial coherence over the range corresponding to the read transducer and/or write transducer separation. That is, measurements made at a read transducer may not directly apply to the media under a write transducer. Both types of media may have defects that create offsets in a measured attribute. Calibrations can be used to estimate the error from a particular measurement. Runout corrections are values recorded on the media that are applied to a measurement to correct these errors. Cross-track position correction values are called Repeatable RunOut (RROs) and timing correction values are called Repeatable Timing RunOut (RTROs). Offset correction fields may contain one or more RRO values and/or one or more RTRO values The techniques and structures described herein may be used in a magnetic memory device, a hybrid drive that incorporates multiple types of media, e.g., both magnetic media and solid state media, and/or an optical memory device, for example. The embodiments discussed herein are illustrated using magnetic disk media, however, it will be appreciated that the approaches are also applicable to other types of media, such as optical or magneto-optical media. FIG. 1A shows a disk 105 and one or more read and/or write transducers 115 (e.g., slider) configured to read data from the disk 105 and/or to write data to the disk 105. As described previously, the techniques and structures described herein may be used, for example, in a magnetic data storage device such as a hard drive. A hard drive generally includes at least one magnetic disk that rotates around a spindle axis. The drive further includes one or more transducer heads positioned over a surface of the disk while reading from or writing to the disk. According to various implementations, embodiments described herein can be used in conjunction with a heat assisted magnetic recording (HAMR) system.

The one or more transducer heads may include both magnetic read and write heads. A read transducer generally operates by detecting a changing magnetic field, e.g., changes in direction of magnetic flux caused by relative motion between an encoded magnetic media and the read transducer. The write transducer operates in response to a write current which generates a magnetic field at a tip of a write pole. This magnetic field in turn changes the orientation of a local magnetic field local at the surface of the disk, causing data to be persistently stored on the disk.

Figure 1B:
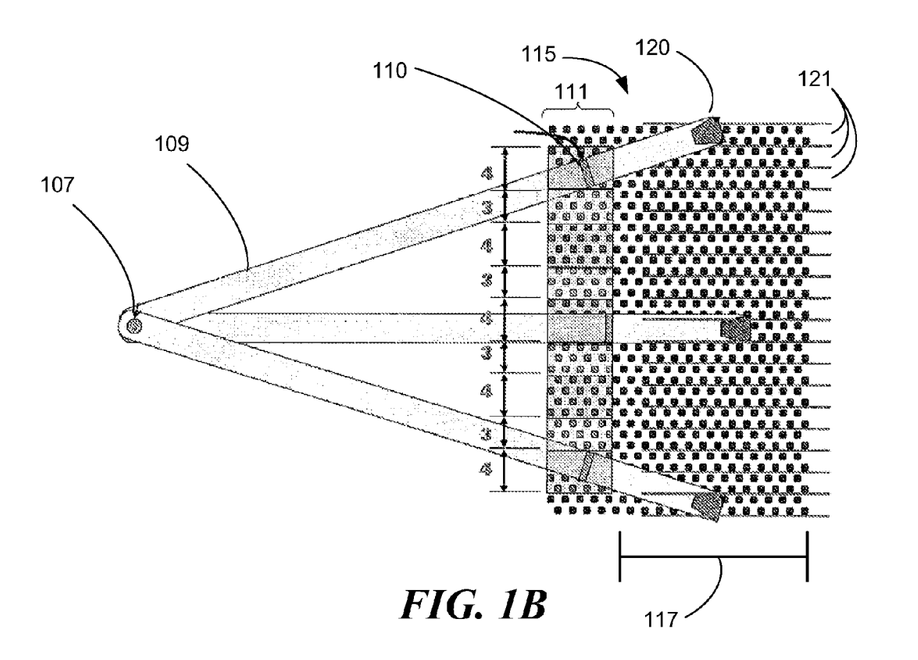
FIG. 1B shows an arm of a storage device in three different positions according to various aspects.

FIG. 1B illustrates a more detailed view of the dashed-line portion of FIG. 1A. FIG. 1B shows an arm 109 of a storage device in three different positions capable of rotating around a pivot 107. The arm 109 includes a read transducer 110 and a write transducer 120 (not to scale). According to FIG. 1B, the read transducer 110 is in a different location than the write transducer 120 on the slider 115. Offset correction values may be used to correct for repeatable errors that occur in cross-track positioning and/or timing of the write transducer 120 and/or read transducer 110. As described previously, RROs and RTROs can be recorded on the disk 105 and applied to correct these repeatable errors. In some cases it may be useful to record RROs and RTROs in a general data pattern instead of on a servo field on a memory device. Creating an area in a pattered servo area to record RROs and/or RTROs can complicate the patterning process. Further, recording the RROs and the RRTOs in the general data recording area may allow for higher bit density.

In some cases, it may be beneficial to write the correction values across more subtracks in the cross-track direction than are used for normal data recording. According to various implementations, a subtrack is one row of dots wide. Each dot represents one storage island, for example.

Writing the offset correction portions across more subtracks than the normal data portion allows for the offset correction values to still be read when the read transducer is at an arbitrary cross-track position while the write transducer is positioned for writing. For example, FIG. 1B shows an offset correction value region 111 and a normal data recording region 117. The tracks 121 in the normal data recording region are two subtracks wide while each of the tracks in the offset correction value region 111 range from three subtracks wide to four subtracks wide, wider than the normal data region tracks. In some implementations, a ratio of the width of the offset correction region to the width of the associated normal data region for at least some tracks is 2:1. Additionally or alternatively, a ratio of the width of the offset correction region to the width of the associated data track portion for at least some tracks is 3:2.

FIG. 1B also shows that the read transducer 110 is closer to the pivot 107 than the write transducer 120 causing the read transducer 110 to traverse fewer tracks in a stroke of the arm 109 than the write transducer 120. Some of the offset correction fields may have a different width than other offset correction fields to accommodate the smaller number of tracks traversed by the read transducer 110. For example, as described above, the widths (vertical dimension in the view of FIG. 1B) of the offset correction value region 111 in FIG. 1B range from three to four subtracks. The widths of the offset correction value region 111 may be substantially equal in other arrangements. Also, in other configurations, a write transducer may be closer to the pivot than a read transducer or a write transducer and a read transducer may be a substantially equal distance from a pivot. In such cases, the offset correction fields may be adjusted accordingly.

In some implementations, it may be desirable to read RROs and RTROs while the write transducer is positioned for writing. For example, when reading RRO and/or RTRO values interspersed in a normal data field, it may be desirable for the device to be ready to write upon completion of the reading of the RRO and/or RTRO values to avoid delays. In various embodiments described herein, the RROs and/or the RTROs are read while the read transducer is positioned for reading.

Figure 2:
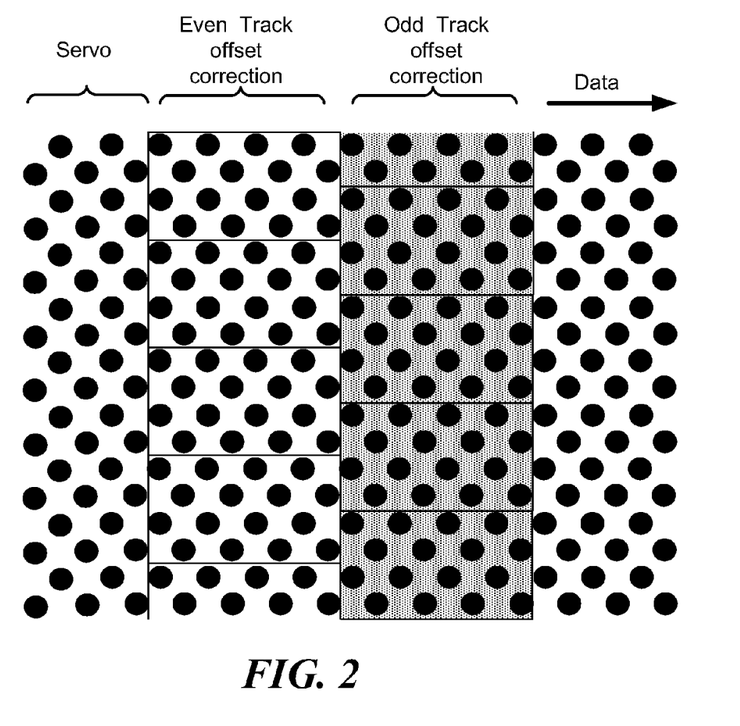
FIG. 2 illustrates a media that includes a servo field, even track offset correction fields, odd track offset correction fields, and a normal data section according to some embodiments.

FIG. 2 illustrates a more detailed view of a portion of the media that includes a servo field, even track offset correction fields, odd track offset correction fields, and a normal data section. The even track offset correction fields correspond to even data tracks and the odd track offset correction fields correspond to odd data tracks. As illustrated in FIG. 2, a servo field may precede the offset correction fields. According to FIG. 2, the even track offset correction fields and the odd track offset correction fields are staggered along a circumferential down track direction. In this example, four subtracks are included in each offset correction field. There may be more or fewer subtracks per offset correction field. As described previously, some offset correction fields include fewer subtracks than other offset correction fields due to the read transducer traversing fewer tracks than the write transducer.

Figure 3:
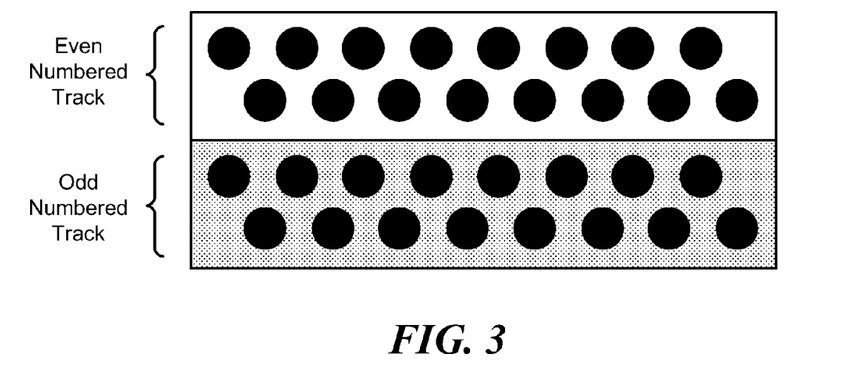
FIG. 3 illustrates a more detailed view of the normal data portion of the media according to various implementations.

FIG. 3 illustrates a more detailed view of the normal data portion of the media. In the example of FIG. 3, there are two tracks represented; an even numbered track (e.g., 2, 4, 6 . . . ) and an odd numbered track (e.g. 1, 3, 5 . . . ). Each track comprises two subtracks. There may be more or fewer subtracks that correspond to a track.

Figure 4:
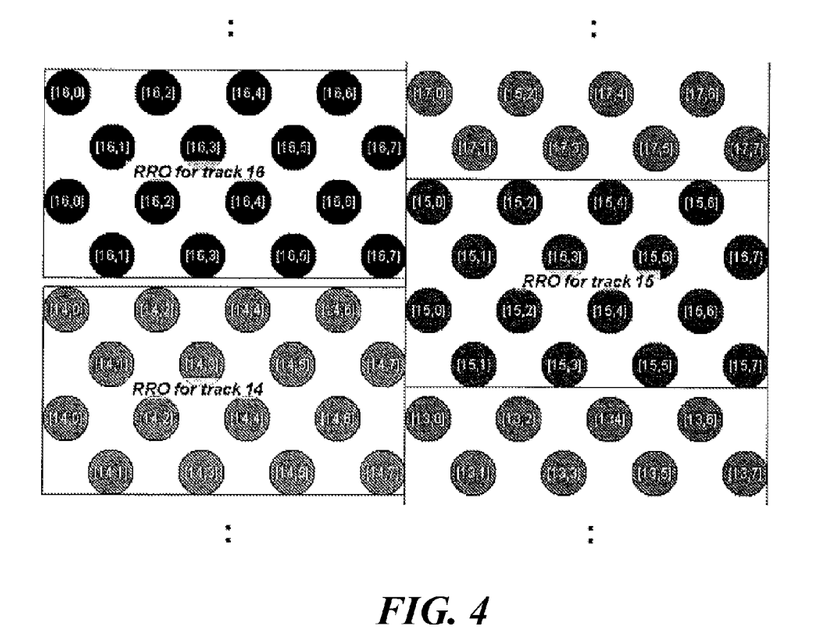
FIG. 4 is a more detailed portion of the offset correction portion according to some aspects.

FIG. 4 is a more detailed portion of the offset correction portion of FIG. 2. As can be observed from FIG. 4, offset correction fields for even numbered tracks are on the left and offset correction fields for odd numbered tracks on the right. In the case of FIG. 4, the offset correction fields are staggered. Staggering the fields allows the offset correction fields to be wider than data tracks so that the values can still be read when the read transducer is at an arbitrary cross-track position. For example, even if the read transducer is between two even track offset fields, it is still positioned in the middle of the odd track offset field. Each offset correction field for a track includes four subtracks. As described previously, there may be some tracks with offset correction fields that have more or fewer subtracks per field. FIG. 4 illustrates that the even data track portions alternate with odd data track portions along a cross track direction. The track's offset correction fields associated with the even data track portions and offset correction portions associated with adjacent odd data track fields are concatenated along a down track direction.

Figure 5:
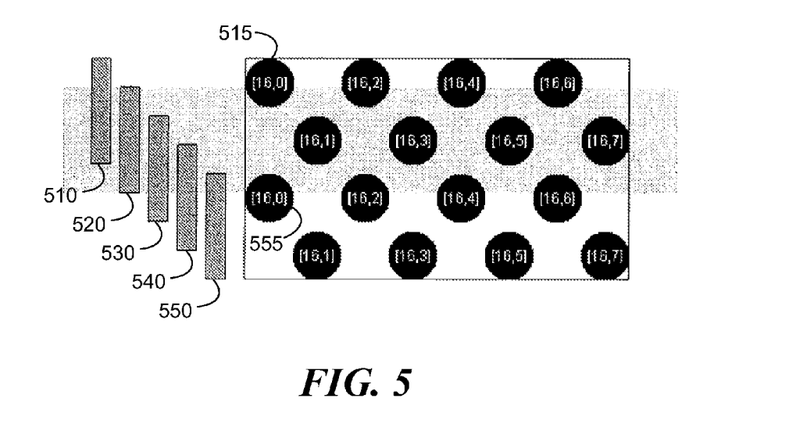
FIG. 5 shows an offset correction field for track 16 with five possible transducer positions according to various implementations.

FIG. 5 shows an offset correction field for track 16. FIG. 5 includes five possible transducer positions. In this case, the transducer is two subtracks wide and will read the same values traversing a field at any of the positions 510-550 shown. Dots with the same number label have the same bit state. e.g., the transducer reads the same data from either of the dots labeled [16,0] 515, 555. For example, a transducer that is in position 510 would read the same bit state from dot 515 as a transducer in position 550 that reads dot 555. A transducer in position 520 would read part of dot 515 and part of dot 555.

Figure 6:
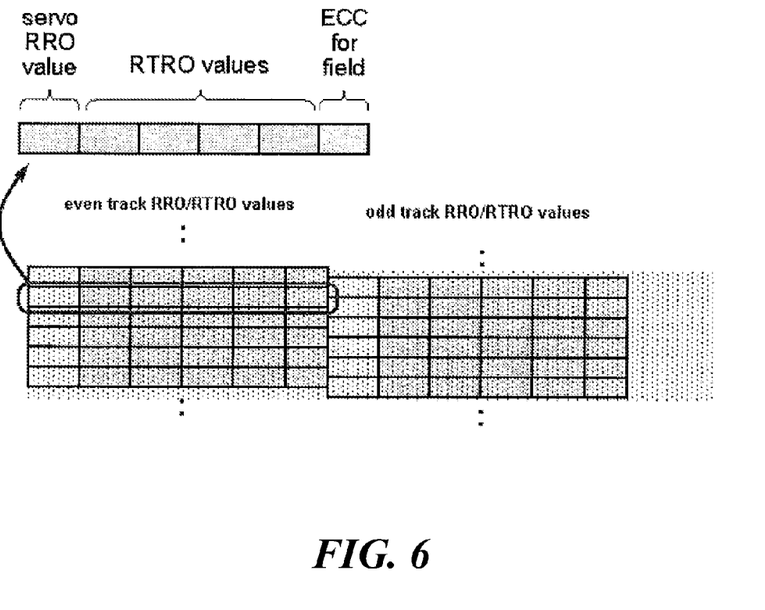
FIG. 6 illustrates a format of an offset correction field containing one or more RRO values, one or more RTRO values, and an ECC value for the offset correction field according to various embodiments.

As described previously, the offset correction fields can contain one or more RRO values and or one or more RTRO values. In some implementations described herein, the RTRO values and the RRO values are concatenated in a field together. There may be one offset correction field per track or there may be more than one offset correction field per track. The field may additionally include an error detection and/or error correcting code (ECC). The ECC is used to detect and/or correct data errors present in the local data (In this case the RRO values and the RTRO values, for example) when the data is read. FIG. 6 illustrates a format of an offset correction field containing one or more RRO values, one or more RTRO values, and an ECC value for the offset correction field. In the example provided in FIG. 6, there are 5 RRO/RTRO values per field; one RRO value and 4 RTRO values and 1 ECC per wedge per track.

As described previously, the RRO and/or RTRO values may need to be read when the write transducer is positioned for writing to the memory device. Additionally or alternatively, the RRO and/or RTRO values are needed when the read transducer is positioned for reading. In some cases there are four sets of RRO/RTRO values per wedge: even track RRO/RTRO values for write transducer position, odd track RRO/RTRO values for write transducer position, even track RRO/RTRO values for read transducer position, and odd track RRO/RTRO values for read transducer position. In some embodiments described herein, the fields used for read positions may not have RTRO values because the timing fields used when reading are close to the area being read, thus there is a lower chance of spatial errors.

Figure 7:
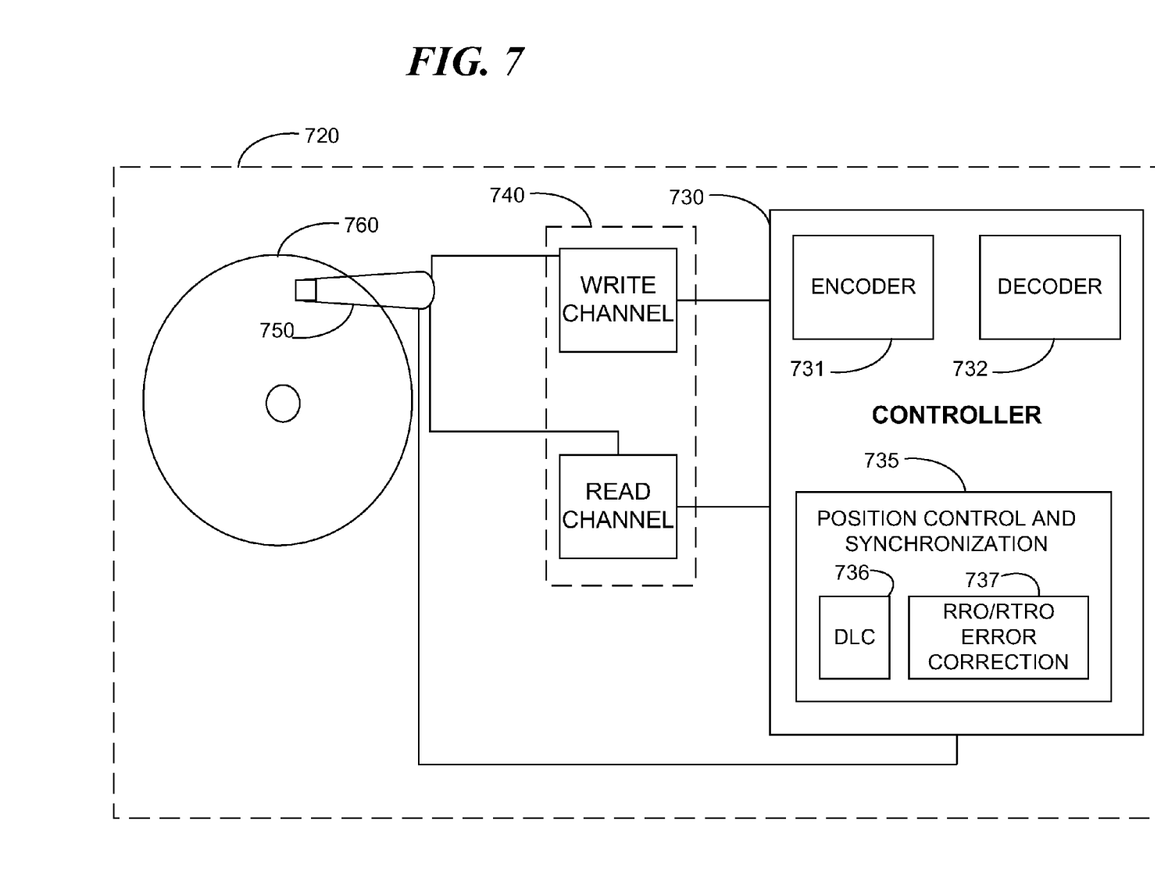
FIG. 7 is a block diagram of a computing system capable of recording repeatable corrections for a memory device according to some implementations.

FIG. 7 is a block diagram of a computing system capable of recording repeatable corrections for a memory device. FIG. 7 includes a memory device 720. The memory device 720 includes a controller 730, one or more read and/or write channels, one or more transducer heads 750, and a medium 760. The memory may be of various types, comprising magnetic media, hybrid drives that incorporate two or more different types of media, and/or optical media.

The one or more transducer heads 750 may include both magnetic read and write heads. A hard disk drive includes I/O interfaces, read and write transducer components, encoding and decoding components 731, 732 and servo mechanisms that appropriately position the respective transducers over the recording media. In addition to encoding and decoding components 731, 732, the controller 730 also includes a position control and synchronization module 735. The position control and synchronization module 735 includes a disk-locked clock (DLC) module 736 and a RRO/RTRO offset correction module 737.

Figure 8:
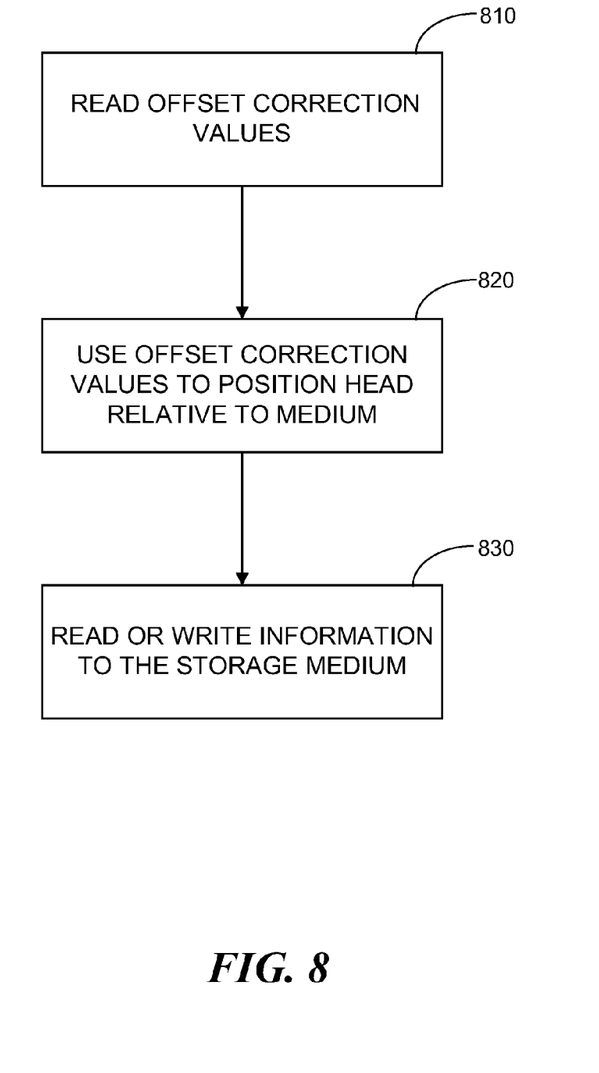
FIG. 8 is a flow diagram illustrating a process for reading position and/or timing correction values according to various aspects.

FIG. 8 is a flow diagram illustrating a process in accordance with embodiments described herein. Position and/or timing correction values are read 810. In some cases, the offset correction values are read at a time when the write transducer is positioned for writing. Offset correction values are used 820 to position the head relative to the storage medium. Information from the storage medium is then read or written 830 to the storage medium. Each offset correction value may be written with a width greater than the data track width of an associated data track. The offset correction values may contain one or both of positional offset correction values and timing offset correction values for the associated data track.

Figure 9:
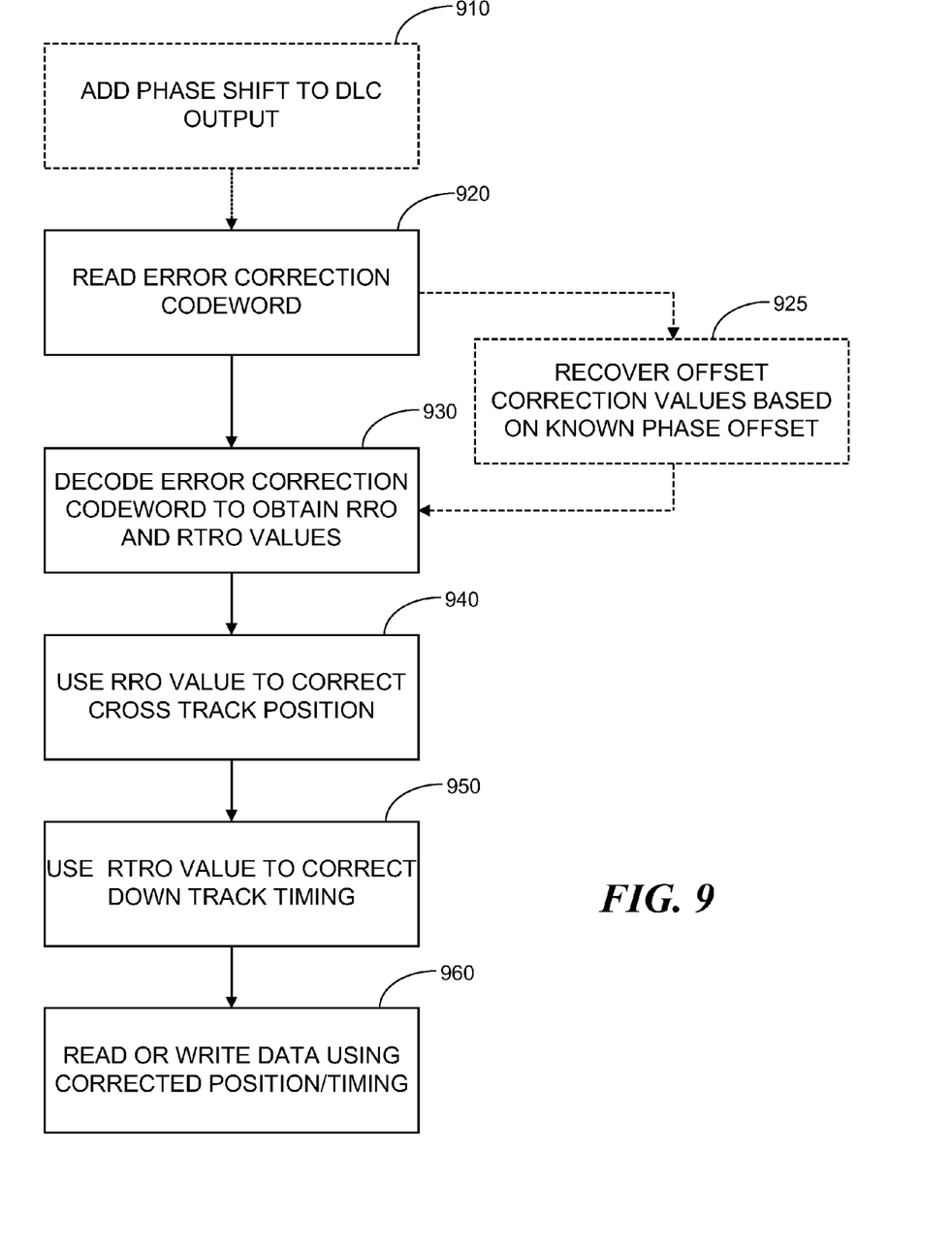
FIG. 9 is a flow diagram illustrating a process for reading position and/or timing correction values using a phase shift according to some embodiments.

FIG. 9 is a more detailed flow diagram in accordance with embodiments described herein. Optionally, a phase shift is added 910 to a disk-locked clock (DLC) output. The phase shift may be used to synchronize read/and write operations by read and write transducers with storage islands in a BPM system, for example. An error correction codeword is read 920. Optionally, offset correction values based on known phase offset are recovered 925. According to various aspects, the offset correction values are read when the DLC is phased for writing to the medium and interpolated timing detection is used to recover the offset correction values based on a known phase offset between the read phase and the write phase of the DLC. The error correction codeword is decoded 930 to obtain RRO and RTRO values. The RRO value is used 940 to correct the cross-track position and the RTRO value is used 950 to correct down-track timing. Data is read or written 960 using the corrected position and timing.

It is to be understood that this detailed description is illustrative only, and various additions and/or modifications may be made to these embodiments, especially in matters of structure and arrangements of parts. Accordingly, the scope of the present disclosure should not be limited by the particular embodiments described above, but should be defined by the claims set forth below and equivalents thereof.

What is claimed is:

1. An apparatus, comprising:
    a storage medium having tracks arranged on the storage medium the tracks including:
        data track portions configured to store data and having a data track width; and
        offset correction portions having a width in a cross-track direction that is greater than the data track width in the cross-track direction of an associated data track, each offset correction portion storing one or both of positional offset correction values and timing offset correction values, the positional offset correction values configured to correct for errors that occur in cross track positioning relative to the medium and the timing offset correction values configured to correct for errors that occur in down track timing relative to the medium.

2. The apparatus of claim 1, wherein each track includes a number of magnetic islands at least partially surrounded by non-magnetic material, each magnetic island configured to store one or more bits.

3. The apparatus of claim 1, wherein the width of the offset correction portions allows the offset correction portions to be read when a read transducer is at an arbitrary cross-track position while a write transducer is positioned for writing to the associated data track.

4. The apparatus of claim 2, wherein each data track portion comprises two rows of magnetic islands and the magnetic islands are staggered along a circumferential down track direction.

5. The apparatus of claim 1, wherein a ratio of the width of the offset correction portion to the width of the associated data track portion for at least some tracks is 2:1.

6. The apparatus of claim 1, wherein a ratio of the width of the offset correction portion to the width of the associated data track portion for at least some tracks is 3:2.

7. The apparatus of claim 1, wherein not all widths of the offset correction portions are equal along the cross track direction.

8. The apparatus of claim 1, further comprising:
    a read/write head including one or both of a read transducer and a write transducer;
    a control system configured to move the head relative to the storage medium; and
    a read/write channel configured to read information from the storage medium via the read transducer, the information including the offset correction values.

9. The apparatus of claim 8, wherein the control system is configured to use one or both of:
    the positional offset correction values to correct for repeatable errors that occur in cross track positioning; and
    the timing offset correction values to correct for repeatable errors that occur in down track timing.

10. The apparatus of claim 8, wherein:
    the storage medium comprises a pattern of storage islands, each storage island at least partially surrounded by a non-storage region; and
    the control system further comprises a disk locked clock (DLC), wherein the control system is configured to use an output of the DLC to synchronize read and write operations by the read and write transducers, respectively, with the storage islands.

11. The apparatus of claim 10, wherein the control system is configured to add a phase shift to the output of the DLC, the phase shift configured to adjust a phase of the DLC from a write phase to a read phase before the offset correction values are read.

12. The apparatus of claim 10, wherein the control system is configured to read the offset correction values when the DLC is phased for writing to the medium and to use interpolated timing detection to recover the offset correction values based on a known phase offset between the read phase and the write phase of the DLC.

13. The apparatus of claim 1, wherein the tracks further comprise servo fields, wherein the offset correction portions are disposed between the servo fields and the data track portions.

14. The apparatus of claim 13, wherein the offset correction portions have higher data density than the servo fields.

15. The apparatus of claim 1, wherein the offset correction portions include one or more of:
an even track offset correction value for an even track write position;
an odd track offset correction value for an odd track write position;
an even track offset correction value for an even track read position; and
an odd track offset correction value for an odd track read position.

16. The apparatus of claim 1, wherein each offset correction portion comprises a single field that includes at least one positional offset correction value and at least one timing offset correction value, wherein the single field is protected by a code.

17. A system, comprising:
a storage medium having tracks arranged on the storage medium, the tracks being arranged so that even data track portions alternate with odd data track portions along a cross track direction the tracks including:
data track portions configured to store data and having a data track width in a cross-track direction; and
offset correction portions having a width in the cross-track direction that is greater than the data track width of an associated data track, each offset correction portion storing one or both of positional offset correction values and timing offset correction values, the positional offset correction values configured to correct for errors that occur in cross track positioning relative to the medium and the timing offset correction values configured to correct for errors that occur in down track timing relative to the medium, and wherein offset correction portions associated with the even data track portions and offset correction portions associated with adjacent odd data track portions are concatenated along a down track direction.

18. The system of claim 17, wherein the offset correction portions associated with the even data tracks are staggered along the down-track direction with respect to the offset correction portions associated with the adjacent odd data tracks.

19. A method, comprising:
reading offset correction values from offset correction portions of tracks arranged on a storage medium, the tracks including data track portions configured to store data and having a data track width in a cross-track direction, each offset correction portion having a width in the cross-track direction greater than the data track width of an associated data track and containing one or both of positional offset correction values and timing offset correction values; and
correcting for one or both of:
errors that occur in cross track positioning relative to the medium using the positional offset correction values; and
errors that occur in down track timing relative to the medium using the timing offset correction values.

20. The method of claim 19, wherein the tracks are arranged so that even data track portions alternate with odd data track portions along a cross track direction, and wherein offset correction portions associated with the even data track portions and offset correction portions associated with adjacent odd data track portions are concatenated along a down track direction.

* * * * *